Feb. 3, 1953 W. L. JANTZEN 2,627,368
GARMENT SHOULDER PADS, METHOD AND MACHINE FOR MAKING SAME
Filed April 17, 1947 4 Sheets-Sheet 2

INVENTOR
William Lloyd Jantzen
BY
Emery, Varney, Whittemore & Dix
ATTORNEYS

Feb. 3, 1953 W. L. JANTZEN 2,627,368
GARMENT SHOULDER PADS, METHOD AND MACHINE FOR MAKING SAME
Filed April 17, 1947 4 Sheets-Sheet 1

INVENTOR
William Lloyd Jantzen
BY
Emery, Varney, Whittemore & Dix
ATTORNEYS

Feb. 3, 1953     W. L. JANTZEN     2,627,368
GARMENT SHOULDER PADS, METHOD AND MACHINE FOR MAKING SAME

Filed April 17, 1947     4 Sheets-Sheet 3

INVENTOR
William Lloyd Jantzen
BY
Emery, Varney, Whittemore & Dix
ATTORNEYS

Feb. 3, 1953 W. L. JANTZEN 2,627,368
GARMENT SHOULDER PADS, METHOD AND MACHINE FOR MAKING SAME
Filed April 17, 1947 4 Sheets-Sheet 4

INVENTOR
William Lloyd Jantzen
BY
Emery, Varney, Whittemore &Dix
ATTORNEYS

Patented Feb. 3, 1953

2,627,368

UNITED STATES PATENT OFFICE 2,627,368

GARMENT SHOULDER PADS, METHOD AND MACHINE FOR MAKING SAME

William Lloyd Jantzen, White Plains, N. Y., assignor, by mesne assignments, to Robert Weber, New York, N. Y.

Application April 17, 1947, Serial No. 742,012

16 Claims. (Cl. 223—57)

This invention relates to an improved garment shoulder pad of a form to fit into men's, women's and children's clothing. The invention also relates to an improved process for producing these pads and to an efficient satisfactory machine or apparatus for producing the novel pads and for carrying out the process.

More particularly the invention provides the quick and efficient production of improved shoulder pads of different sizes and shapes and of different materials, and to provide shoulder pads that will not be effected by cleaning fluids and will not become "knotted" or bumpy as a result of dry cleaning liquids and treatments.

Also more particularly, the invention provides improved apparatus for forming or shaping the fillers or padding that go into the pads to the desired sizes and configurations, and to provide an improved process for quickly and efficiently producing the pads at a greatly reduced cost.

In general, it may be stated that garment shoulder pads usually comprise a filler or padding of some nature, and an outside cover, and, in some instances, include a means for holding a bent or deformed filler in its deformed position. The shoulder pad art requires the ability to make new designs quickly and to have the outside covers thereof available in various colors. Under the present use of shoulder pads, especially in dresses, many of the dress owners remove the pads before sending the dress to the cleaners, or before washing the dress. The invention herein provides for the production of an improved shoulder pad that resists the entrance of cleaning fluids to the interior of the pads, and, therefore, the pads may be left in the dresses that go to the cleaners.

It is well known that many variations of shoulder pads have been made for men's suits, for girls' and women's dresses and for all types of overcoats. It has been well known that various materials have been employed for making these pads. In view of the fact that these pads are relatively thick at one end and decrease to a somewhat feather edge at the opposite end, and then are formed usually into a crescent to have the edge drop down over the shoulders of the wearer, it, therefore, has been found to be quite difficult and costly to satisfactorily and efficiently produce the decreasing thickness to the feather edges as well as forming or shaping the pad to fit over and down the sides of the shoulders of the wearer.

The improved invention herein accomplishes these difficult operations quickly and efficiently and produces fillers or padding with very smooth and satisfactory surfaces. Also, the novel steps of the operations are carried out at relatively very low costs.

Again, many of the shoulder pads now made and inserted in suits, dresses, coats and other clothing are required to be removed, mostly in dresses, from such clothing before being sent to the dry cleaners, or these pads after the trip to the cleaners will be bumpy and out of shape or will be spoiled by reason of disintegration due to dry cleaning liquids. Also, the returned goods usually carry an offensive odor from the cleaning fluids.

The improved invention herein produces a novel pad that will return to its original shape after being crushed or pressed and will not be bumpy or remain out of shape after cleaning and pressing. Also, the improved pad will not be destroyed by the cleaning fluids and will not carry the odor of the cleaning fluids.

Another important feature of this invention is the provision of an improved apparatus which will quickly produce or cut the shoulder pad fillers from a blank so that the filler and later the complete pad will have a predetermined curvature. In cutting the pad filler to the designed form, there will be cut off material but this cut-off material is very near the form required for a shoulder pad of smaller size and is, therefore, usable and will not be wasted. Also, some of this cut-off material will have a configuration that is employed for "building up" elements to give shoulder pads of greater thickness at some places. This built-up type of pad allows the use of a thinner original blank to start with.

With the improved process herein, all of the original material is used. It has been found that with the improved process that there is practically little or no so-called waste material in the production of the novel pads herein and that many sizes and styles may be readily produced.

Another most satisfactory and advantageous feature of this invention is the provision of a means for shaping the filler or padding to give desired configuration and to allow this step in the operation to be done very rapidly and at low cost, and still maintaining flexibility.

One of the ways and apparatus for accomplishing this end will be described herein as the preferred, but modifications may be made thereof.

Heretofore the shoulder pads have been produced by several different methods, such as by building up and shaping tuftings; by assembling pieces of uniform thicknesses but of different areas; by molding; by assembling together small wads of textile material of different sizes and stitching them; by taking a blank of predetermined thickness and skiving it off by slashing off various amounts on each stroke until the blank has been tapered from its full thickness down to the feathered edge; or by making the pads by specifically hand made assembly and stitching together the various textile pieces. All of these various methods are costly, time consuming and require many people and large floor area to produce a relatively small number of pads.

Heretofore no one has been able to quickly and efficiently produce a smooth well tapered pad filler consistently and repetitively, without any changes in size and shape, and to accomplish these results at low cost and without requiring a large number of people to obtain the results. The invention herein provides for the uniform production of a particular design of a shoulder pad in quantity without changes in dimensions or shape, thereby eliminating human element of guessing at dimensions and shapes and special curvatures.

One of the particular features of this invention is to provide the improved shoulder pads herein of a predetermined design and to do it quickly and cheaply and repetitively and to shape the pad as desired for fitting various sizes of shoulders, and, when desired, to provide a properly shaped "duct's tail" on that part of the pad that extends up under the collar of a coat or to provide a relatively small hump on the top surface of the pad.

In the invention herein, the novel apparatus provided for accomplishing these steps and the method of operation thereof are very simple, and the apparatus is small, and a pad of predetermined shape is easily produced in uniformity at a very low cost.

In the preferred form of apparatus for producing a pad filler from a blank to a finished contour or form, a mold is provided which has a definite concaved part for receiving therein a part of the blank of the material. A suitable means is provided for pushing or pressing the blank into the concaved part of the mold and for holding it there during the processing. This pushing means or pressure element usually has a convex part that engages the blank and holds it in the mold. In the preferred apparatus the pressure element preferably is formed to have its convex part be the counterpart of the concaved portion of the mold. It will be readily noted that a blank may be set in front of the mold and by moving the pressure element toward the mold the blank will be forced into the concave configuration of the mold. The mold and the pressure element as thus pushed together, without too much pressure, are then passed through a sharp, moving knife or saw so that the knife passes between the mold and the pressure element or the holding means. The result is that a satisfactory curved shoulder pad filler or padding or unit with smooth surfaces, uniformly tapered portions extending from the thick end to the feathered edge is quickly and satisfactorily produced. Also the cutaway part of the blank remains and is easily cut substantially in the middle to thus form two smaller shoulder pads. The correct contour of filler is thus produced and later may be bent or deformed to give further bending to fit a designed coat, dress or suit.

It will be readily understood that the concave portions of the mold may be formed to various depths and contours so that the blank will be forced into them and held and while so held, a knife or saw passes across the surface of the mold, thereby cutting through the blank in a straight line but part of the blank is sunk in the mold. The final surface contour of the pad filler will be the contour constituting the concave configuration in the mold.

It has been found that most satisfactory results are obtained when the pushing or pressure element or convex element has the reverse configuration to that of the mold. Also, it is helpful to have the convex pusher element mounted so that there is a small amount of resiliency between it and its support. A relatively thin layer of foam rubber between the element and holder for the convex pusher has proven very satisfactory.

Instead of making a single pad filler per operation the concave mold may be made of a shape somewhat simulating a diamond and having its middle relatively deep. This will produce a double, or two, or a pair of pad fillers. The article so produced may be cut through the middle of the thickest part, thereby forming two pad fillers.

The preparation of a mold having a concave configuration therein is very easily and quickly produced. Therefore, it is to be understood that molds with different configurations may be available at all times or if a special shape of pad is desired, a mold is quickly provided.

The particular type of material for the pads herein is a hair type, which has animal hair fastened to and into each side of one or more pieces of burlap. Also what is known as latex wool may be employed where the blank is built up of several layers of about ⅛″ thick of uniform thickness of latexed wool. Both materials when subjected to the squeezing between the mold and pressure element and the cutting operation herein to be described, is completed, produce most satisfactory shoulder pad fillers.

After a pad filler has been originally produced or cut to form, they may be shaped or bent over a mandrel to a desired deformed position, then one or more strips of linen or other satisfactory holding flexible material is pasted to them to hold them to the predetermined or deformed position which usually is a half-moon, to fit over the shoulder. Other forms of holding means may be employed when desired for special purposes or otherwise.

The top of a shoulder pad is preferably a straight line from the front of the thickest portion to the back feather edge thereof. It is sometimes advisable to create a little greater thickness or to change the shape or contour along this line or at the feather edge. In such instances, the concave mold may be cut out so as to allow for this added thickness. The added thickness at the feather edge of the pad is usually known as the "duck's tail" and this portion fits on the shoulder near the collar of the coat or dress in men's and women's clothing. A "hump" may be made near the thick end of the filler, if desired, to prevent pocketbook shoulder straps from sliding off.

In providing the improved shoulder pad in a completed form which may be inserted and fastened in dresses, suits or coats, in many instances, it is usual to cover the formed material, filler or padding. Any particular covering material may be employed. Usually it is desired to provide a cover material of a color that will agree with colors of dresses, and the like. It is usual in making the cover to leave an extending portion or edging or rim beyond the edge of the filler or padding so that the pad may be easily sewn in position in the garment. In other instances, it is desired that a covering be employed which is of strictly waterproof nature so that water or cleaning fluids will not reach the formed filler or padding.

One of the preferred covers for the padding is a light weight, textile material that has been impregnated so that it is waterproof. The impregnated material, however, is such that the extra or extending edgings or rims of the cover may be sealed together by heat. This allows a pad to be provided that may be of any color and is waterproof and may be easily covered over the padding or filler and sealed at its edges. When desired, the cover may be firmly fastened to the filler as by gluing or otherwise. A cover properly sealed is produced at a reduced cost of manufacture as well as quickly answering the demands for different colors.

Another feature of this invention is to employ the same kind of mold but having the concaved configuration continued so that a hole is formed all the way through the mold and allows a padding or sheeting or suitable blank to be pushed through the mold and then the saw or cutter employed will be moved along the surface of the mold and cut off that portion of the blank or padding which has been forced through the hole. It has been found that brassière forms are readily and quickly made by employing a mold and machine of this type. These brassière forms when desired, may be covered with the waterproof coating or any other suitable coating, as mentioned above, or may be directly assembled in the brassière bodies.

In some cases it may be desirable to have more than one hole through the mold so as to have more than one part of a blank extend through the mold and have several parts cut off. Also, the holes through the mold may have configurations other than round.

Other advantages and features of the improved invention will be noted during the reading of the detailed description which follows and when taken in connection with the accompanying drawings, wherein.

Figures 1, 2, 3, 4, 5, 6, 7, 8, 9, 10, 11:
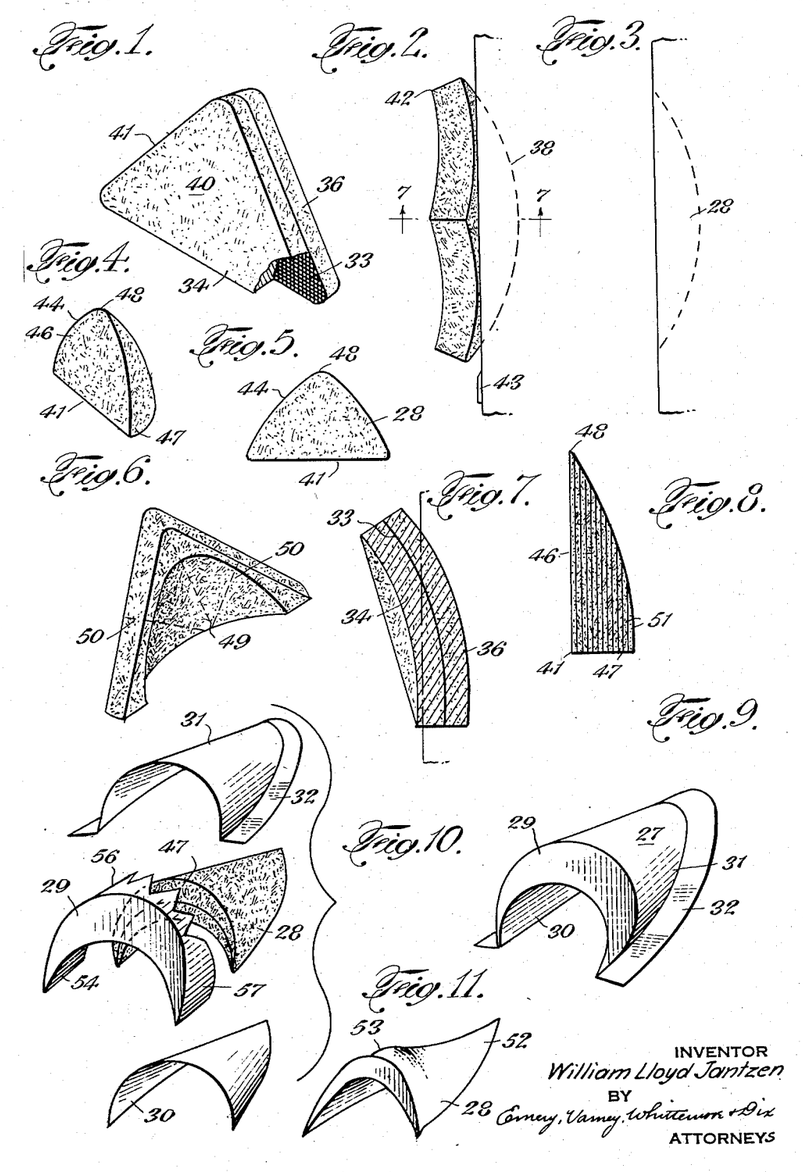
Fig. 1 is a blank of the material from which fillers for shoulder pads are formed.
Fig. 2 is a top plan view of the blank of Fig. 1 when positioned in a mold portion of the apparatus.
Fig. 3 shows a view of the filler after being cut as indicated in Fig. 2.
Fig. 4 is a perspective view of the filler after being cut and removed from the mold.
Fig. 5 is a top plan view of the filler shown in Fig. 4.
Fig. 6 is the cut-away portion of the blank shown in Fig. 1 after the filler has been cut out.
Fig. 7 is a sectional view taken on line 7—7 of Fig. 2.
Fig. 8 is a sectional view of a filler made of laminated material.
Fig. 9 is a perspective view of a complete shoulder pad.
Fig. 10 is an exploded view of the shoulder pad of Fig. 9 showing the various elements making up the complete shoulder pad.
Fig. 11 is a perspective view of a filler of different shape and one having a "duck's tail" that fits under the collar of a coat and that has a "hump" therein.

Referring now to Figs. 1 to 11, inclusive, one form of shoulder pad 27 is shown in Fig. 9 and its component elements are shown separate in Fig. 10, in which there is a filler or padding 28, a front facing 29, cover 30 for the under side, and a top cover 31. This top cover is preferably provided with an extension or rim 32 to allow the pad to be easily sewn into a garment.

The shoulder pad has the filler or padding 28 formed of any particular design and size and curvature. Such a filler may be made of any desired material such as cotton, kapok, reinforced animal hair, as will be described more in detail herein, foam or sponge rubber, wool, latexed wool, or any other suitable material which preferably is of light weight and is readily formed and will withstand the crushing of pressing and will not be affected by cleaning fluids such as water or dry cleaning fluids.

In the description herein for presentation of the improved shoulder pad, itself, and the apparatus for producing the same, and the process for making the same, the filler 28 and the preparation of it will be described.

The filler described herein as one of the many types of fillers, has proved satisfactorily for dresses, men's clothing, and especially for coats for both men and women. This sample filler is made from a blank comprising burlap and animal hair, or equivalents. A particular example form of blank herein is shown in Fig. 1 in which one stretch of burlap 33 is provided and has groupings of animal hair 34 and 36 intertwined into the burlap and the hair fibers themselves are intertwined and the whole forms a very firm body blank. The material is usually formed in large sheets and the blanks indicated in Fig. 1 are cut therefrom.

Figure 12:
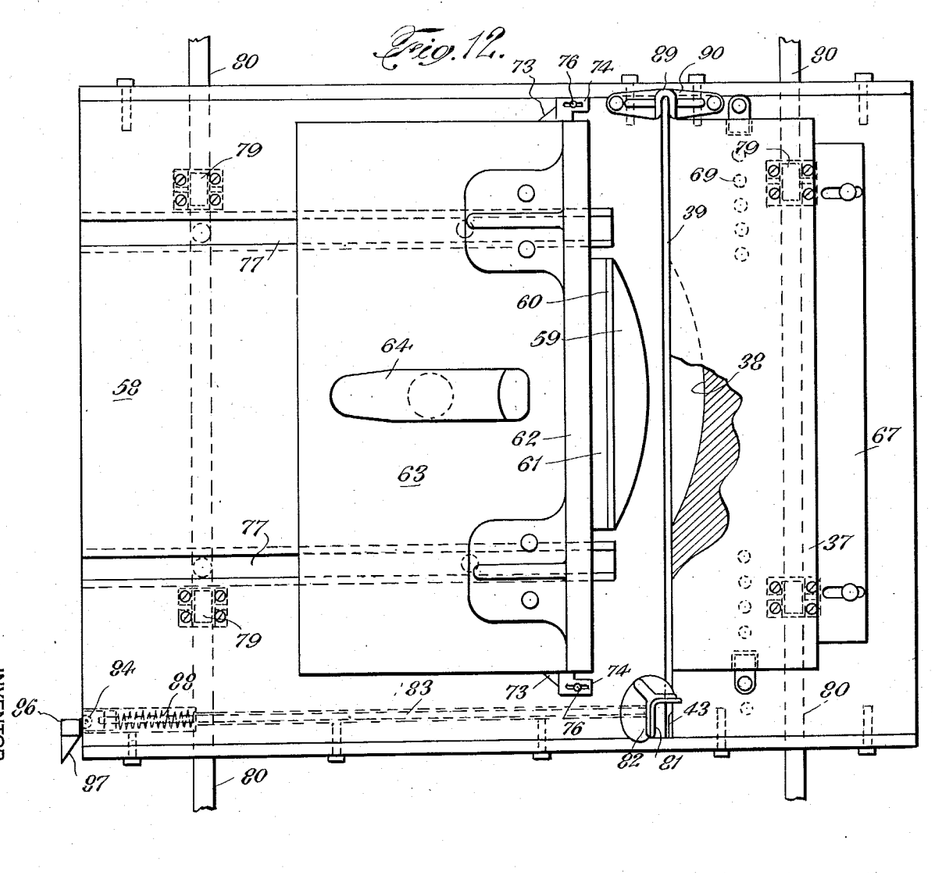
Fig. 12 is a top plan view of the apparatus for producing the shoulder pad filler shown in Figs. 3, 4, 5, 8 and 11.

A mold 37, see Fig. 12, is formed with a concaved part 38 in surface 39 so as to give a definite configuration in the concaved or depressed part of surface 39. The blank 40 of Fig. 1 is placed in front of the mold 37 with edge 41 at the bottom of the mold 37. Fig. 2 shows in diagrammatic form, the blank 40 pressed into the curved depression 38 and there remains an overhang 42. The mold having the blank therein as indicated in Fig. 2, is moved relatively to a cutter 43 which is usually a band knife or saw. The means for holding the blank in position and the operation will be described more in detail later.

After the blank and the mold have been moved past the cutter 43, the overhang or cut-away 42 is removed and the filler 28 has been formed as shown in Fig. 3. When this filler is removed from the mold and stood on its edge 41, its appearance in perspective is noted in Fig. 4 while the top plan view is shown in Fig. 5, wherein 41 is substantially a straight edge and the portion of the filler extending back from the straight edge takes somewhat the form of a half-moon having curved edge 44, the ends of which join the ends of edge 41, as shown in Fig. 5. The filler or padding 28, shown in Figs. 4 and 5, shows the filler product shaped or formed by the molds, and it will be noted that it is not deformed or bent. This so formed integral filler product or unit has a bottom surface 46 and a thick front edge 47, which edge gradually reduces in thickness back to the point 48 where it meets the edge 44 of the surface 46 and forms a substantial feather edge therewith. The preferred thickness of the pad unit herein is indicated in Fig. 8 and shows the gradual reducing of the thickness back to the point 48. Likewise from the preferred thickness of edge 47 the filler reduces in thickness to the side edges 44 as well as back to the point 48.

A filler or padding 28 as produced by the method herein described and shown in Figs. 4 and 5, is such that it may be squeezed, pressed, folded or otherwise crumpled, and when released, it will return to its natural unbiased position. This filler in its unbiased or natural position is a formed or shaped filler. This filler 28 for the purpose of making a shoulder pad is usually curved or deformed or biased into the form shown in Fig. 10 and is so held by any suitable means which preferably is flexible.

It will be understood that the filler itself may be placed in another shallow mold, partly convexed with the surface 46 exposed and have this surface cut to concave form and thus provide a filler that is of somewhat crescent shape in its thick end in its unbiased or normal condition.

The overhang part 42 of the blank 40 that is cut away, is illustrated in Fig. 6 and may be cut through the dotted line 49 to form two smaller pads which may be bent along the lines 50 to form a curvature somewhat like the pad filler 28 shown in Fig. 10.

When it is desired to form fillers that are of slightly larger size than shown in Fig. 6, the blanks 40 may be cut into larger size and then treated in the machine. In many cases the fillers or paddings 28 may be made of laminated material which is laid up to form a blank 40, and then the blank is treated by cutting to desired shape and size. This laminated material is particularly attractive when the wool body which has had a small amount of rubber sprayed on it, is employed and is known as latexed wool. Usually this latexed wool is formed in small interengaging laminations 51, as shown in Fig. 8 and form an integral blank. A blank of the latexed wool will pass through the improved machine herein and be cut to desired size and form in very quick time and completed very easily. The latexed wool makes an exceptional satisfactory light weight integral filler unit which may be deformed easily but will return to either its unbiased position or to the position in which the pad is deformed in a crescent or similar curvature.

It is to be noted that the fillers or paddings 28 may be formed in any size or shape. Fig. 11 illustrates a filler which includes a "duck's tail" end 52. These "duck's tail" ends are desired because they allow the thin edge of the pad that is nearest to the neck of the coat or dress to be tucked up under the collar and easily fastened to the coat or dress, thereby to give proper shape. Fig. 11 illustrates a broader crescent shape curvature of the pad than the pad of Fig. 10.

In making the filler shown in Fig. 11, the mold 37 may be easily formed with a varied contour surface so that the pad which results from the operation of the improved apparatus herein will quickly and easily give a well shaped "duck's tail" end. Also when a design of shoulder pad calls for a hump 53, the mold will be modified so that such a hump will be formed in the pad during the cutting treatment.

Thus, the production of a suitable and preferred filler or padding has been described. In this instance, the filler in its unbiased position normally has a flat surface 46. In the further steps of preparing the improved shoulder pad, it is desired to bend one end of the filler 28 to a somewhat crescent shape, as shown in Figs. 10 and 11, and to provide suitable means for holding the same in the bent or deformed position. This holding means may include several modified forms. A coating of stiff lacquer may be placed on the underside of the filler, and if desired, over the top, thus to hold the filler in satisfactory bent or deformed position. Again, a cover may be made to surround the filler in its curved position and be used to hold the filler in a deformed position as well as acting as a complete cover for the filler. It has also been found to be a very satisfactory holding means to apply the lower cover 30 with its upper surface covered with an adhesive and placed on the underside of the filler while the latter is in bent or deformed position. Again, the filler may be easily held in its deformed position by gluing the facing 29 to the front surface 47 of the filler, as deformed, and allow the lower part 54 of the facing 29 to engage part of the underside of the filler and to have the pointed ends 56 engage part of the top surface of the filler. In some instances instead of using the pointed ends 56 across the whole length, a full sweep 57 may be used, or there may be a combination of points 56 and sweep 57, as indicated in Fig. 10. It has been found that the use of the facing 29 maintains the filler in proper curved position without including the lower cover 30 or the upper cover 31. Thus, there is provided a suitable flexible means for holding the filler in deformed position.

Usually, a suitable means for fastening a shoulder pad in position in the garment is provided, and such a means is indicated as the rim 32 which, in this design, is an extension of the upper or top cover 31 which usually is applied to the filler after facing 29 and lower cover 30 have been affixed to the filler.

With these steps of applications of the facing 29 and the covers 30 and 31, complete shoulder pad, as shown in Fig. 9, is available to be inserted into a garment. Any other suitable means for holding the filler 28 in its deformed position may be employed. In some instances, the filler 28 may be formed or cut to the desired shape and then the facing 29 and the covers 30 and 31 applied, or any suitable cover may be employed.

By employing desirable fabric for facing 29 and covers 30 and 31, and adhering them to the filler, a very satisfactory shoulder pad is produced which is resistant to water and to dry cleaning fluids, and these pads are allowed to remain in garments which are sent to the dry cleaners. It will be noted that any of these pads are fully flexible and may be crumpled and deformed during cleaning and pressing of the garment but they will return to their deformed shapes.

In assisting to produce a leak-proof or waterproof shoulder pad, the lower cover 30 may have an extension as a rim, formed on it which will engage rim 32 of the upper cover 31 and these rims may be readily sealed together in any suitable manner such as by heat to thereby form a definite seal against the entrance of cleaning or other fluids, to the interior of the pad. In other instances when an extension or rim is added to cover 30, such extension may be folded up against the side of the filler 28 in the same manner as the points 56 engage the filler. Such sealing together for some width is advisable so that any sewing in the rim would not let any cleaning fluids reach the filler. It will be noted in contrast that the ordinary conventional sewing would not bind the rim sections together sufficiently to make a liquid-proof seal.

Thus, it will be seen that the method of producing an improved shoulder pad includes the steps of properly positioning the blank in the mold, treating the blank to produce or form a filler or padding of predetermined shape and size, and then bending or deforming the pad to a satisfactory angle simulating a crescent, and then applying a satisfactory flexible means for holding the filler in such a bent or deformed position, and then covering the pad with a suitable cover, whether of any desirable textile material or of textile or other like goods which have liquid-proof characteristics, and then sealing the various cover components or edge openings together to prevent any fluids from reaching the filler.

If desired, the covers may be made up in one piece and the filler inserted therein and the edges of the openings sealed together. With the improved structure herein, it will be noted that an improved shoulder pad is produced without sewing and is fluid-proof, and, therefore, it will not be destroyed by cleaning fluids. Cover material may be of any colors and of any flexible material, such as taffeta, silk, rayon, cotton, any of which may be satisfactorily treated to be liquid-proof. In other instances these covers may be treated with impregnated material which includes the recent type of application of a plastic and which makes the textiles proof against passage of fluids. It will be noted that the shoulder pads as produced, may be deformed and crumpled in pressing but will return to biased curvatures.

In deforming or bending the fillers to a preferred angle of crescent shape, a suitable holder with a depression therein may be provided, and a filler pressed therein to the shape and then the facing 29 or cover 30 or both, or any other holding means, may readily be applied.

The preferred machine or apparatus for producing the improved filler will now be described.

Reference is particularly made to a suitable platform 58 which receives the mold 37 and a pressure element 59 mounted on a resilient sheeting 60 carried by the movable plate 61 that is mounted on a vertical support 62 which in turn is carried on a sub-platform or holder which is provided with a handle 64 for moving the sub-platform backward and forward to press the blank 40 into the depressions in the mold 37. Later in this description a double pad filler instead of the single blank 40 is shown to be treated. The platform 58 is mounted on a table 66 of any suitable machine, which includes a circular band knife or saw 43 or other suitable cutter. The platform 58 may be moved relative to the cutter or knife 43 or this knife may be moved relative to the platform. In the preferred structure herein, it is desired that the band saw or cutter shall travel through a definite circular path and the platform 58 moved relatively to the cutter.

In preparing the apparatus, the mold 37 has the depression 38 formed therein to conform to the configuration desired for one surface of a filler, and then the mold is positioned on the table 58 preferably by employing the screw-type bolts 68 which may be placed in any of the openings 69 depending upon the size or width of the mold and the screw threaded nuts 70 with their extensions 71 which project into openings 72 in the side of the mold and are screwed down so that the extensions 71 firmly engage the mold 37 and hold it in position. Any other type of means for fastening the mold in position may be included, as desired, and if necessary, reinforcing elements may be added so that the mold will not spring from its adjusted position during the cutting treatment step. Also, a plate 67 is provided to assist in holding the mold in position. As noted in the drawings this plate may be adjusted to a desired position.

The pressure element 59 is desired to be of any configuration that will easily hold the blank 40 in position against the concave or depressed surface 38 of the mold 37. The resilient sheeting 60 compensates for varied back pressures due to variations in the thickness of the blank 40 or for other reasons. In some cases the sheeting 60 may be only pieces or strips properly positioned, or even may be substituted by springs. It is preferred, however, that the convex face of the pressure element 59 be a counterpart of all of the varied depths or depressions 38 in surface 39 and be positioned opposite the concave portions of the mold, thereby making sure that all parts of the blank are satisfactorily held in the various depressions in surface 39. It is desired that the pressure element 59 not press too strongly or too lightly, and to accomplish this end, the sub-platform or holder 63 is provided with ears 73 which engage stops 74 mounted on the platform 58. Fastening nuts 76 are employed to hold the stops 74 in suitable adjusted position so that the pressure element 59 will only move forward to a definite position to produce suitable pressure on the blank 40 and thereby force it into position in the depressions of mold 37.

Figures 19, 22:
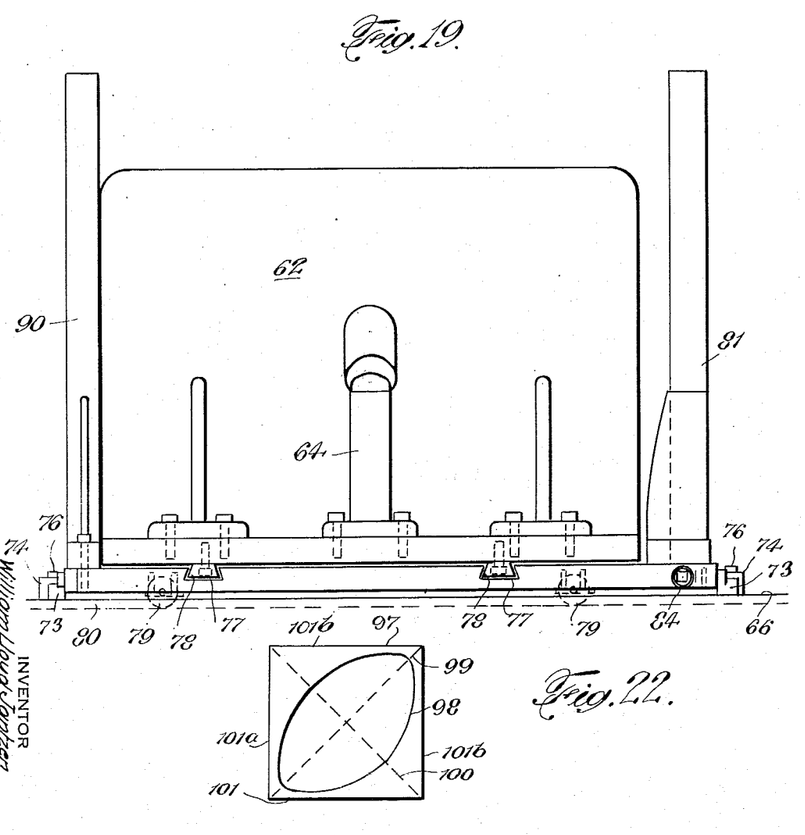
Fig. 19 is a front elevational view of the movable part of the apparatus for holding the filler blank in position.
Fig. 22 is a top plan view of a blank that is square and the full diamond shaped line indicates the cutting therefrom of a double pad filler, and the dotted lines indicate the quarters of the cut-away portions.

The sub-platform or pressure element holder 63 moves back and forth in channels 77, see Fig. 19, which preferably are dove-tail shape and downward extensions 78 carried by the sub-platform 63 properly engage the dove-tail channels and hold the sub-platform in desirable positions during the operations of the apparatus.

After the blank has been placed in position in mold 37 and pressure element 59 brought into definite engagement with the blank, the platform 58 and the mold 37 and the sub-platform 63 are all moved relatively to the cutter 43 by causing the platform 58 to move on wheels 79 which operate in grooves 80 and maintain the platform in proper position in respect to the cutter 43, whether it is a saw or a very sharp knife. In this fashion, the filler is cut from the blank and the cut-away portion 42 of the blank is available to be cut again to form smaller shoulder pad fillers.

In view of the fact that the cutter 43 is either a saw or very sharp knife and is running at high speed, it becomes very desirable to have suitable safety means provided so that there will be no injuries to the operator. One form of safety means comprises post 81 which is pivoted at 82 and is held in the position illustrated in Fig. 12 by a push rod 83 which carries a roller 84 on its left hand end and which roller is shown on top of a wedge 86 which has a taper 87 that roller 84 rides up. A spring 88 is provided to normally maintain the push rod 83 to the left and when roller 84 has passed down the taper 87, the rod 83 will move to the left and the safety post 81 will pivot about point 82 and move out of the way of the cutter 43 thereby allowing the cutter to have the mold and the pressure element and the blank therebetween move relatively to the cutter so that the blank is treated by cutting to produce a shoulder pad filler. The moving platform 58 which, as noted before, carries the mold and the pressure element and the blank relative to the cutter to a position where the cutter is blocked from further movement by stop point 89 on post 90. If desired, this stop may be adjusted into any desired position.

The platform 58 may be carried on any type of carrier mounted in the machine which carries cutter 43 and provides for its fast movement for treating or cutting the blanks. The size of such carrier is such that the platform 58 may be moved so that the blank as installed and carried in the mold passes beyond the cutter 43, thus providing substantially and satisfactory supporting means so that the treating or cutting is done without the platform 58 being biased out of its assembled alignment.

Figures 13, 14, 15, 16, 20, 21:
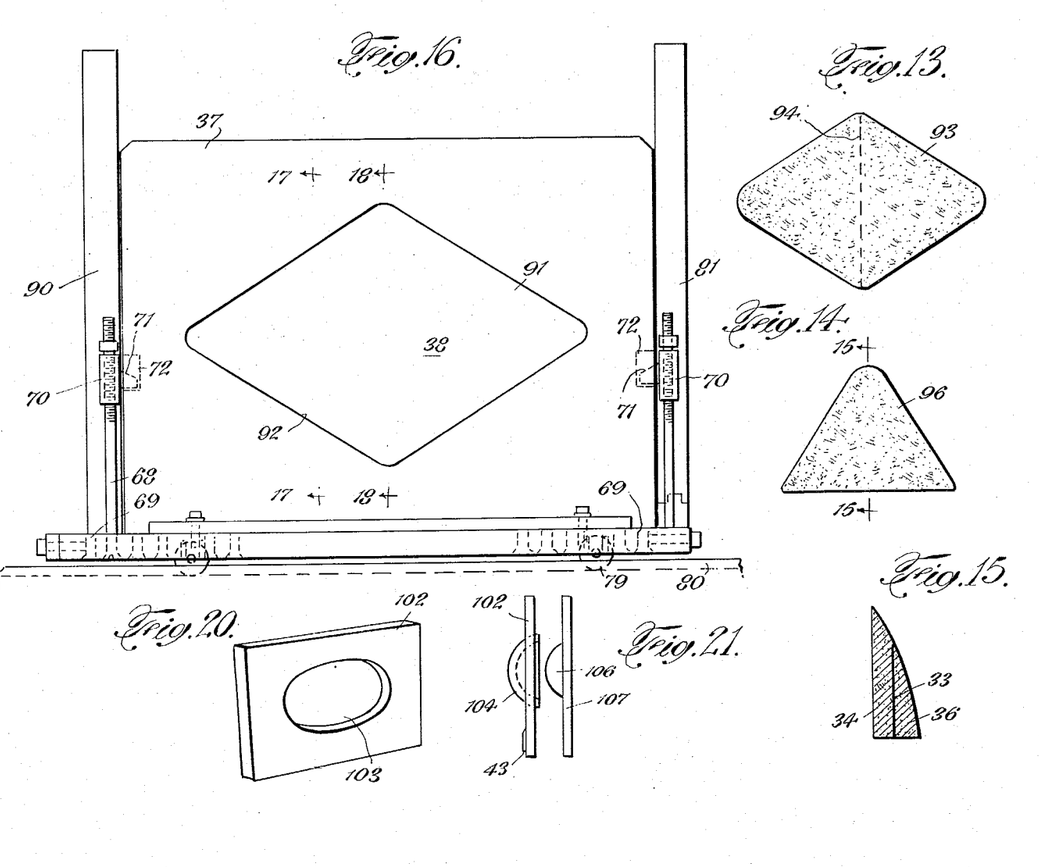
Fig. 13 shows a double shoulder pad filler before being cut to form two fillers.
Fig. 14 shows a single pad filler produced by cutting the pad of Fig. 13 in the middle.
Fig. 15 is a sectional view of the pad taken on the line 15—15 of Fig. 14.
Fig. 16 is a front view of part of the machine for producing the double pad shown in Fig. 13.
Fig. 20 is a perspective view of a modified form of mold which is used in the manufacture of brassière forms or other like products.
Fig. 21 is a top plan view of the mold and the movable pressure element for pushing the blank into position during the cutting operation of the machine for the brassière forms.
Figure 17:
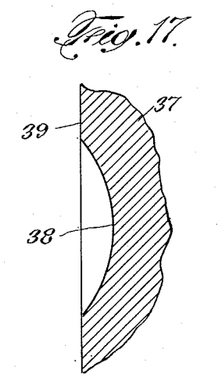
Fig. 17 is a sectional view of the mold of the apparatus shown in Fig. 16 and taken on the line 17—17 thereof.
Figure 18:
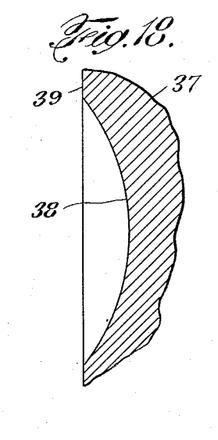
Fig. 18 is a sectional view of the mold taken on the line 18—18 of Fig. 16.

Referring now to Fig. 16, the diamond shape concavity 91 in the mold is illustrated as formed in one position in the mold. It is to be understood that this concavity may be turned by having its center line in other positions. For instance, it may be desirable that edge 92 shall be parallel to the lower edge of the mold, or in any other position so that the most efficient treating or cutting operational step of the machine may be most satisfactorily accomplished.

With the diamond shaped concavity 91, a double pad filler 93, see Fig. 13, will be produced and this will be cut in two portions, preferably along dotted line 94, to produce two shoulder pad fillers, one of which is illustrated at 96 in Fig. 14. The sectional view of the pad filler 96 taken on the line 15—15 of Fig. 14 illustrates the hair filler which is composed of the burlap stretch 33 and the two sides 34 and 36 of animal hair. As noted above, such pad fillers may be made of other materials when desired.

In producing these double pad fillers, it will be understood that the size of the blank employed may be such that the cut-away portions will be readily used for making smaller pads.

Referring to Fig. 22, a blank 97 that is square is employed and the diamond shaped line 98 shows where a double pad filler has been cut from the blank 97. The dotted lines 99 and 100 outline the quarters of this remaining cut-away portion, which is cut into quarters and the back edges 101a of two quarters are placed together and preferably glued into position, and then are placed in the mold 37 and the pressure element 59 presses this newly formed blank into the concavity of the mold and the whole is moved relatively to the cutter 43 and a new double pad filler is produced. Likewise, the quarters 101b are placed back to back and a second new blank is formed from which another double pad filler is cut out. Thus, it will be noted from the square 97 there will be three double pad fillers obtained and there will be substantially no waste.

For the purpose of making additional types of products or for cutting channels or the like in pads already provided, or for making a special product as for instance, the making of brassière forms, reference is made to Figs. 20 and 21. A modified mold 102 is provided with an opening 103 which is the extension of the concave portion in one surface of the mold or if desired, may be just a straight hole through the mold 102. For the purpose of making the brassière forms the blank 104 is shown as extending through the mold 102 and has been pushed into that position by a modified form of pressure element 106 carried by a support 107. After pushing the blank 104 into position through the opening, the pressure element may be withdrawn somewhat so that a suitable cutter moving along the left hand surface of mold 102 will not cut the pressure element but will cut off the portion of the blank 104 which extends through the opening 103. For the purpose of cutting various shapes of brassière forms or other products, the opening 103 may be modified as desired to give oval shape or more or less of a flat shape or otherwise.

In some instances, it may be desirable to form only relatively small slits in the mold 102 and allow only a portion of the thickness of blank 104 to extend therethrough and then have the cutter cut off the portions of the blank which extend through the slits, thus to form types of grooves or channels in the blank.

It will be noted from the foregoing detailed descriptions that a low cost, very satisfactory form of complete shoulder pad may be formed by the improved apparatus herein and by following the outlined process. Also, by following the process of making the improved complete pads and by employing the improved apparatus herein, the new pads are produced at a very greatly improved rate of speed which has been instrumental in reducing the cost of the pads. It will be understood that the mold herein may be easily formed to a precise contour and of any design or configuration. In one instance, it has been very easy to form a mold of plaster of Paris and produce the desired concavities and depressions therein, and then to surface the mold with a coating of material which hardens quickly and which wears well. Such a prepared mold has been most satisfactory in producing shoulder pad fillers of special designs. When a design is desired for large repetitive production, a metal mold may be easily cast from the plaster mold.

It will be understood that various modifications and changes may be made in the formation of the fillers and of the complete pads and the process of making the same and in the machine and its method of operation, such modifications and changes are considered as being within the scope of the claims which follow.

The invention claimed is:

1. In the method of forming shoulder pads for garments, the steps of cutting out from an integral uniformly thick blank an integral filler unit having a maximum thick part and a feather edge part and having a gradual change of thickness between said two parts, bending said integral filler unit to a curvature to fit over a human shoulder, attaching a flexible member to said filler as so bent to hold the same in its deformed position, sealing a liquid-proof cover to said filler to prevent liquids from reaching said filler.

2. In the method of forming garment shoulder pads resistant to cleaning fluids, the steps of cutting out from an integral uniformly thick blank an integral filler unit having a maximum thick part and a feather edge part and having a gradual change of thickness between said two parts, deforming said filler unit to a curvature to fit over a human shoulder, attaching a flexible member to said filler as so deformed to hold said filler from returning to its unbiased shape, inserting said filler in a cover resistant to cleaning fluids, and sealing said cover tight to prevent liquids from reaching said filler.

3. In an apparatus for producing shoulder pad fillers, a mold in a cutting machine and adapted to be moved to and from a predetermined position therein, a knife positioned to have said mold pass in front thereof, the surface of said mold nearest the knife being concaved to form predetermined depressed configuration, said mold receiving an integral blank of cuttable material against the surface nearest the knife and having some of said material forced into the concaved portion, said knife adapted to cut away the material that extends beyond the surface of said mold as said mold is moved past said knife.

4. In an apparatus for producing shoulder pad fillers, a mold assembled in a machine and adapted to have predetermined movements therein, said mold having a portion of a free surface thereof concaved to varied depths, an integral blank of uniform thickness of cuttable filler material placed against said free surface, a pressure element also assembled for engaging said blank and pressing it into the concave configuration of said mold, and a cutter for cutting said blank as so deformed when there is relative movement between said cutter and the so assembled mold and pressure element, the line of cutting being along said free surface of said mold and between it and said pressure element to thus form an integral shoulder pad filler of varying thickness.

5. In an apparatus for producing shoulder pad fillers, a mold assembled in a machine, said mold having a portion of a free surface thereof concaved to varied depths, an integral blank of uniform thickness of cuttable filler material placed against said free surface, a pressure element having a convex surface formed as the counterpart of approximately the varied depths of concavity in the free surface of said mold, said pressure element engaging said blank and forcing the same into said concavities of said mold with the convex portions of said pressure element being opposite to their counterparts of depths in said mold, and a cutter for cutting said blank as so deformed when there is relative movement between said cutter and the so assembled mold and pressure element, the line of cutting being along said free surface of said mold and between it and said pressure element to thus form an integral shoulder pad filler of varying thickness.

6. In an apparatus for producing separate integral shoulder pad fillers, a mold assembled in a machine and adapted to have predetermined movements therein, said mold having a portion of a free surface thereof concave to various depths, an integral blank of cuttable filler material placed against said free concave surface, a pressure element also assembled in said machine and opposite to the concave portion of said mold, said pressure element being convex to approximately the same extent and to varied amounts to correspond to the varied depths of concavity in said mold, a holder for supporting said pressure element and adapted to be moved to and from said mold, a resilient element mounted between said holder and said pressure element and carrying said pressure element, and a fast moving cutter for cutting that part of said blank between said mold and said pressure element while firmly assembled against said mold during the movement of said mold and said pressure element relatively to said cutter to thereby cut out an integral shoulder pad filler from said blank.

7. In an apparatus for producing shoulder pad fillers, the combination of a platform in a machine, a circular cutter passing down through said platform, a mold mounted in said machine and adapted to pass in front of and in close proximity to said cutter, said mold having one surface thereof concave to give a predetermined configuration, a pressure element held opposite said concave surface of said mold, a blank of integral cuttable material placed between said concave surface of said mold and said pressure element and being firmly held against said concave part of said mold while said mold and said pusher element as so assembled are passed by said cutter which cuts the material that extends from the concave surface of said mold.

8. In an apparatus for producing shoulder pad fillers, a mold assembled in a machine and adapted to have predetermined movements therein, said mold having a portion of a free surface thereof concave to various depths, an integral blank of cuttable material placed against said free surface, a pressure element also assembled in said machine and opposite to the concave portion of said mold, said pressure element being convex to approximately the same extent and to varied amounts to correspond to the varied depths of concavity in said mold, a holder for supporting said pressure element and adapted to be moved to and from said mold, a resilient element mounted between said holder and said pressure element, adjustable stops to limit the movement of said pressure element toward said mold and carrying said pressure element, and a fast moving cutter for cutting that part of said blank between said mold and said pressure element while firmly assembled against said mold during the movement of said mold and said pressure element relative to said cutter to thereby cut out an integral shoulder pad filler from said blank.

9. In an apparatus for producing shoulder pad fillers, a platform in a machine, a fast moving cutter in said machine and adapted to have said platform moved relatively thereto, a mold mounted on said platform, said mold having a free surface concaved to varied depths, a sub-platform mounted on said platform and movable therewith relatively to said cutter, a pressure element carried by said sub-platform, said pressure element being positioned opposite the concave portions of said mold, said element having convexities of varied sizes which correspond to the configuration of the varied depths in said mold surface, a resilient element mounted between said pressure element and said sub-platform, and a blank of cuttable material placed against the free surface of said mold and pressed into the concave configuration by moving said pressure element toward said mold; said platform, said sub-platform, said mold and said pressure element as assembled together with said blank pressed into said mold moved relative to said cutter to have said cutter passed between said mold and said pressure element to thereby cut the shoulder pad filler from said blank.

10. In an apparatus for producing shoulder pad fillers, a platform in a machine, a fast moving cutter in said machine and adapted to have said platform moved relatively thereto, a mold mounted on said platform, said mold having a free surface concaved to varied depths, a sub-platform mounted on said platform and movable therewith relatively to said cutter, a pressure element carried by said sub-platform, said pressure element being positioned opposite the concave portions of said mold, said element having convexities of varied sizes which correspond to the configuration of the varied depths in said mold surface, an integral resilient element mounted between said pressure element and said sub-platform, a blank of cuttable material placed against the free surface of said mold and pressed into the concave configuration by moving said pressure element toward said mold; said platform, said sub-platform, said mold and said pressure element as assembled together with said blank pressed into said mold moved relative to said cutter to have said cutter passed between said mold and said pressure element to thereby cut out an integral shoulder pad filler from said blank; and a safety guard mounted on said platform to cover the front of said cutter when the apparatus is not in operation, and an automatic mechanism for moving said guard out of cutter guard position when said platform is moved to cut said blank.

11. In the process of forming fillers for shoulder pads, the steps of forming predetermined concave portions in a free surface of a mold, firmly placing a blank of uniform thickness and of cuttable filler material against said surface and into said concave portions, and passing said mold in front of a cutter which cuts the blank material extending beyond the free surface of said mold.

12. In the process of forming shoulder pad fillers, the steps of forming predetermined concave portions in a free surface of an integral mold, placing a blank of uniform thickness of cuttable filler material against said concave surface, pressing said blank into the depressions in said surface, holding said blank in said position, passing said mold in front of a cutter which cuts the filler out of said blank, bending one end of said cut filler into approximately a crescent shape, applying a flexible member to said filler as so bent for maintaining said filler in its deformed position, and applying a cover to surround all of said filler.

13. In the process of forming brassière fillers, the steps of forming a concave portion in the free surface of a mold and having an opening through said mold as an extension of said concave portion, placing the blank of cuttable brassière filler material against the concave surface, pressing said blank into said concave surface and through said opening, holding said blank in said position, passing said mold in front of a cutter which cuts off that portion of the filler which extends through said opening, bending said brassière filler as so cut into a substantially cup-shape, and applying a flexible member to said filler as so deformed to maintain it in the deformed position.

14. In the method of forming a garment shoulder pad filler for use in garments, the steps of cutting from a blank of integral material of uniform thickness an integral filler having a maximum thick part and an outer feather edge part and a gradual tapering from one part to the other, bending said filler to a somewhat half-moon shape, attaching to said filler a cover of larger area than said filler in a manner to maintain said filler in its substantially half-moon shape, and fastening the extending area of said cover to a garment.

15. In the method of forming a shoulder pad filler for garments, the steps of cutting from an integral uniformly thick blank of material an integral filler having a thick part and a gradual tapering portion extending to feather edges thereof, bending said filler to fit the shoulder of a person with the thick part to be positioned at the outer end of the shoulder, applying a flexible member to said filler as so bent, and fastening said flexible member to said filler as so bent in a manner to maintain said filler in its deformed shape.

16. In the method of forming a shoulder pad filler for garments, the steps of cutting from an integral uniformly thick blank of material an integral filler having a thick part and a gradual tapering portion extending to feather edges thereof, bending said filler to fit the shoulder of a person with the thick part to be positioned at the outer end of the shoulder, applying heat and pressure to said filler as so deformed to give a self-sustaining bent shoulder pad filler, cooling said filler on being released from said pressure, and attaching to said deformed filler a cover of greater area than said filler.

WILLIAM LLOYD JANTZEN.

REFERENCES CITED

The following references are of record in the file of this patent:

UNITED STATES PATENTS

| Number | Name | Date |
|---|---|---|
| 2,082,503 | Meadows | June 1, 1937 |
| 2,172,499 | Chassaing | Sept. 12, 1939 |
| 2,389,934 | Rothenberg et al. | Nov. 27, 1945 |
| 2,399,731 | Gillman | May 7, 1946 |
| 2,421,895 | Leebow | June 10, 1947 |
| 2,459,489 | Bloom | Jan. 18, 1949 |
| 2,461,881 | Diamond | Feb. 15, 1949 |

FOREIGN PATENTS

| Number | Country | Date |
|---|---|---|
| 542,687 | Great Britain | Jan. 23, 1942 |